A. H. GUSSMAN.
DUPLICATING MACHINE.
APPLICATION FILED APR. 1, 1909.
1,089,127.
Patented Mar. 3, 1914.
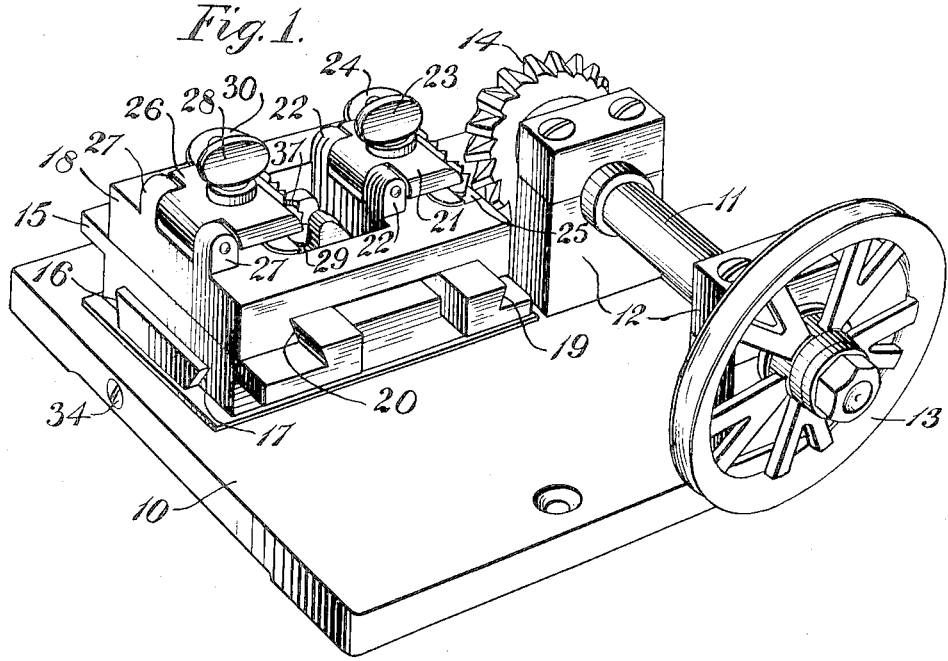
Fig. 1.
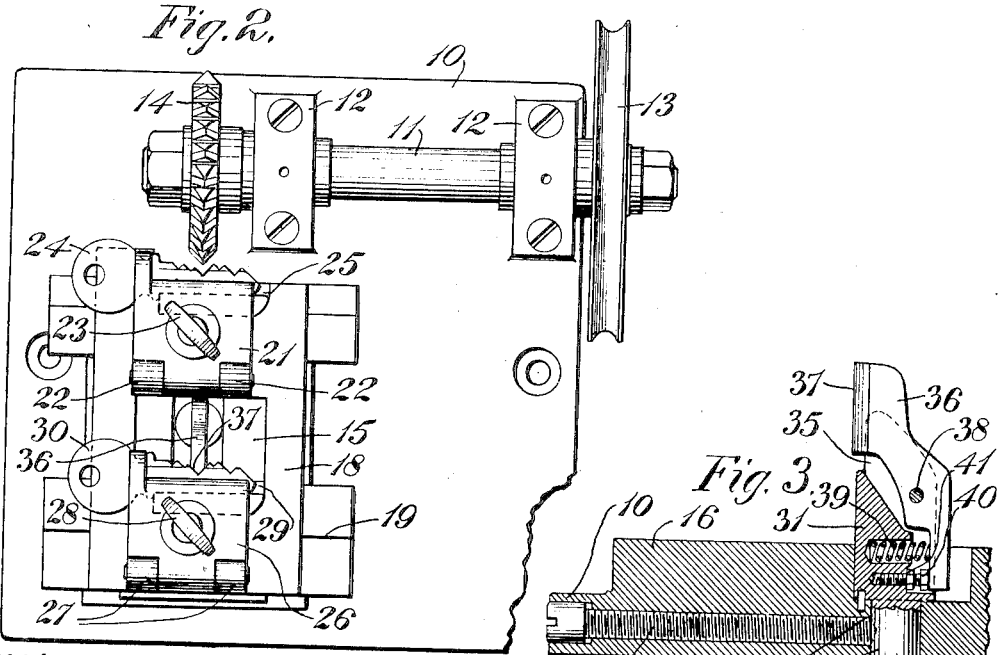
Fig. 2.
Fig. 3.
Witnesses:
T. H. Elliott.
S. S. Grotta.
Inventor.
August H. Gussman.
by Arthur C. Jenkins.
Attorney.

UNITED STATES PATENT OFFICE.

AUGUST H. GUSSMAN, OF EAST ORANGE, NEW JERSEY, ASSIGNOR TO GUSSMAN KEY CUTTING MACHINE CO., OF NORTH PELHAM, NEW YORK, A CORPORATION OF NEW YORK.

DUPLICATING-MACHINE.

1,089,127. Specification of Letters Patent. Patented Mar. 3, 1914.

Application filed April 1, 1909. Serial No. 487,286.

*To all whom it may concern:*

Be it known that I, AUGUST H. GUSSMAN, a citizen of the United States, and a resident of East Orange, in the county of Essex and State of New Jersey, have invented a new and Improved Duplicating-Machine, of which the following is a specification.

My invention relates to the class of devices herein set out, and the object of the invention is to provide a device of this kind having novel features of advantage and utility.

One form of machine embodying the invention and in the use of which the object sought may be attained is illustrated in the accompanying drawings, in which—

Figure 1 is a perspective view of a machine embodying my invention. Fig. 2 is a top plan view of the same, one corner of the base being broken away. Fig. 3 is a detail view in section through a portion of the base showing the manner of securing the positioning device.

While constructions embodying the invention may be adapted to the formation of articles of various kinds and shapes and produced from various materials, it is especially applicable to the duplication of keys, more especially those used in pin tumbler locks, and for this reason I have selected a machine especially adapted for the duplication of such keys for the purpose of illustration and description herein.

In the accompanying drawings the numeral 10 denotes a bed, made of any suitable material and of proper form and thickness to support the mechanism and to be secured if desired to a bench or like object. A shaft 11 is mounted in bearings on shaft supports 12 and has secured at one end a driver, as a pulley 13, to receive a belt from any suitable source of power, and at the other end a cutter 14 for cutting and shaping the articles to be produced.

A main slide 15 is mounted on the bed for movement toward and away from the cutter 14, in the construction herein shown a dovetailed projection 16 from the bed engaging within a similarly shaped groove 17 in the slide. A cross-slide 18 is mounted on the main slide for movement laterally of the cutter, the manner of mounting this slide being similar to that for mounting the main slide, a dove-tailed projection 19 on the main slide engaging a similarly shaped groove 20 in the cross-slide. The cross-slide 18 bears clamps upon its upper surface, the blank clamp being of any suitable form and construction to hold the blank, as herein shown a plate 21 being pivoted as between lugs 22 and having a screw 23 engaging the slide to hold the blank 24 in place in the recess 25 located at the front edge of the plate and between it and the slide. A like clamp for a pattern is located on the slide 18 back of the key clamp. This clamp may be similarly formed and includes a plate 26 pivoted between lugs 27 secured to the slide and having a clamp screw 28 for holding a pattern 30 in a recess 29 at the front of the plate.

It will be understood that any suitable form of clamp may be employed for holding the articles in place, and that these clamps may be variously located as to relative arrangement and at the same time produce the same results.

A device for positioning the blank with respect to the cutter is located for full engagement of the pattern before contact of the cutter with the blank. This positioning device is constructed to allow the slide or other bearer of the blank to be moved toward the cutter to the proper extent to cause the latter to cut the blank to the required shape, and the engagement of the pattern with the positioning device prior to contact of the cutter with the blank holds the slide from accidental movement and thus provides for accurate cutting of the blank by the cutter.

In the form of construction herein shown a post 31 is secured to the base 10 as by means of a stem 32 held in a recess 33 in the base. This post may be secured in any desired manner, in the form shown herein a screw 34 projecting through the base and engaging a recess in the stem to prevent displacement of the latter. The post 31 has a slot 35 in which the positioning device 36 is pivotally mounted. This positioning device has an engaging edge 37 formed to engage the notches within the key or pattern. This positioning device is mounted on a pivot 38 in the post and a spring 39 located in a recess in the post holds the positioning device in place to engage the pattern before contact of the cutter with the blank. A stop 40 is located in position to receive the lower end of the positioning device and limits its movement. In the preferred form of construction and as herein shown this stop consists of a screw secured within the post 31 and having a lock nut 41 for holding the stop screw in any position of adjustment.

It will be noted from the above description and the accompanying illustration that the pattern, as a key, the form of which is to be duplicated, engages with the positioning device before contact of the cutter with the blank. This enables the blank to be accurately positioned with respect to the cutter and to be brought into contact therewith at the proper point. The positioning device acts as a holder to prevent throwing of the blank out of position at the initial engagement of the cutter with the blank.

As hereinabove described, the invention embodies a structure in which the blank is initially positioned with respect to the cutter, that is, the position of the blank with respect to the cutter is determined and fixed before engagement of said parts so far as movement of the blank laterally of the cutter is concerned.

It will be noted from the above description and accompanying illustration that with the blank and pattern clamped in position, the slide 18 being carried forward by means of the slide 15, will cause the pattern 30 to be fully seated against the edge of the positioning device 36 before the blank 24 comes in contact with the cutter, and this engagement of the pattern with the positioning device effectually prevents lateral movement of the slides and hence of the pattern and blank during such engagement. The movement of the slides toward the cutter being continued, after such engagement of the pattern and positioning device, the blank is carried into contact with the cutter causing a notch to be formed in the blank and without danger of the blank being twitched or jerked sidewise by the operation of the cutter.

While in the device herein shown the location of the pattern clamp is directly back of the blank clamp and in line therewith and the cutter, the relative positions of the blank and pattern may be variously changed so long as the relative position of the blank and pattern are the same as the relative position between the cutter and the positioning means.

In the device shown and described herein the initial or predetermined position of the blank with respect to the cutter is obtained by means of notches in the pattern, but various constructions for initially determining the position of the slide bearing the blank, or for otherwise securing this result, may be employed without departing from the spirit and intent of my invention, and I do not therefore limit my invention and the scope of the following claims to the precise construction herein shown and described.

I claim—

1. A cutting device and a positioning device normally spaced apart in fixed relation, the latter being arranged for limited yielding movement to permit the cutter to operate upon a blank, and a blank holder and a pattern holder operatively located with respect to said devices.

2. A cutter and a positioning device normally spaced apart in fixed relation, the latter having a limited yielding movement toward the cutter, a holder for a blank and a holder for a pattern, and means for moving said holders to engage the pattern with the positioning device and the blank with the cutter.

3. A blank holder, a cutter to operate upon a blank held by the blank holder, a pattern holder supported to act in positioning one of said parts, means for reducing the space between the cutter and blank holder, means for changing the relative positions of the blank and cutter in a direction laterally of said cutter, a post, a positioning device mounted on the post to engage a pattern and having a limited movement to permit engagement of the cutter and blank, and means for limiting the movement of the positioning device.

4. A blank holder, a cutter to operate upon a blank held by the blank holder, a pattern holder supported to act in positioning one of said parts, means for reducing the space between the cutter and blank holder, means for changing the relative positions of the blank and cutter in a direction laterally of said cutter, a post, a positioning device pivotally mounted on the post to engage a pattern and having a limited movement to permit engagement of the cutter and blank, and means for limiting the swinging movement of the positioning device.

5. A blank holder, a cutter to operate upon a blank held by the blank holder, a pattern holder supported to act in positioning one of said parts, means for changing the relative positions of the blank and cutter in a direction laterally of said cutter, a post removably secured in position, a positioning device mounted on said post and having a limited movement to permit engagement of the cutter and blank, and means for limiting the movement of the positioning device.

6. A base having a socket opening to the upper surface thereof, a blank holder supported on the base, a cutter supported on said base to operate upon a blank held by the blank holder, a pattern holder supported on said base to act in positioning one of said parts, means whereby the space between the cutter and blank holder may be reduced, a post projecting into said socket, a holding screw projecting edgewise into the base and in engagement with said post, and a positioning device movably mounted on said post.

7. A cutter, a positioning device, a blank holder and a pattern holder, said holders having a normally fixed relative position, and said parts being arranged and operated in the normal operation of the device to permit engagement of the positioning device and pattern before engagement of the cutter and blank.

8. A device of the character described comprising a bed, a carriage mounted for movement on the bed, blank supporting means carried by the carriage, a pattern supporting means carried by the carriage in alinement with the blank supporting means, a cutting means on the bed, said carriage being capable of movement toward the cutting means, and means interposed between the blank supporting means and the pattern supporting means and freely movable in the same directions as the carriage and engageable with the pattern for limiting the movement of the carriage toward the cutting means.

9. A device of the character described comprising a bed, a carriage mounted for movement on the bed, blank supporting means carried by the carriage, a pattern supporting means carried by the carriage in alinement with the blank supporting means, a cutting means on the bed, said carriage being capable of movement toward the cutting means, a pedestal projecting upward from the bed between the blank supporting means and the pattern supporting means and a stop pivoted to the pedestal and freely movable to engage the pattern to limit the movement of the carriage toward the cutting means.

10. A device of the character described comprising a bed, a carriage mounted for movement on the bed, blank supporting means carried by the carriage, a pattern supporting means carried by the carriage in alinement with the blank supporting means, a cutting means on the bed, said carriage being capable of movement toward the cutting means, a pedestal projecting upward from the bed between the blank supporting means and the pattern supporting means, a stop pivoted to the pedestal and freely movable to engage the pattern to limit the movement of the carriage toward the cutting means, said stop being provided with means contacting with the pedestal to limit the movement on its pivot.

11. A machine of the character described comprising a frame, a cutting means carried by the frame, a carriage carried by the frame, a second carriage carried by the first named carriage, each of said carriages being movable in a direction laterally to the direction of movement of the other carriage and one of said carriages being movable toward and from the cutting means, a blank supporting means carried by one of the carriages adapted to hold a blank in position to be engaged by the cutting means, a pattern supporting means carried by said carriage, and means to engage the pattern to limit the relative movement between said carriage and cutting means.

12. A cutter, a positioning device, a blank holder and a pattern holder, said holders having a normally fixed relative position and said parts being arranged and operated to cause the positioning device in its normal position to engage the pattern before engagement of the cutter with the blank.

AUGUST H. GUSSMAN.

Witnesses:
IRVING T. STEVENS,
FREDERIC H. OLFERS.

Copies of this patent may be obtained for five cents each, by addressing the "Commissioner of Patents, Washington, D. C."